US006764605B2

(12) United States Patent
Donaldson et al.

(10) Patent No.: US 6,764,605 B2
(45) Date of Patent: Jul. 20, 2004

(54) PARTICLE TOLERANT ARCHITECTURE FOR FEED HOLES AND METHOD OF MANUFACTURING

(75) Inventors: Jeremy Donaldson, Corvallis, OR (US); Naoto A. Kawamura, Corvallis, OR (US); Daniel A. Kearl, Philomath, OR (US); Donald J. Milligan, Corvallis, OR (US); J. Daniel Smith, Corvallis, OR (US); Martha A. Truninger, Corvallis, OR (US); Diane Lai, Corvallis, OR (US); Norman L. Johnson, Corvallis, OR (US); William Edwards, Albany, OR (US); Sadiq Bengali, Corvallis, OR (US); Timothy R. Emery, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 19 days.

(21) Appl. No.: 10/061,923

(22) Filed: Jan. 31, 2002

(65) Prior Publication Data

US 2003/0142185 A1 Jul. 31, 2003

(51) Int. Cl.[7] .................................................. C03C 15/00

(52) U.S. Cl. ............................ 216/39; 216/56; 216/57; 216/79; 216/99

(58) Field of Search .............................. 216/27, 39, 56, 216/57, 79, 99; 347/93; 29/890.1

(56) References Cited

U.S. PATENT DOCUMENTS 6,260,957 B1 7/2001 Corley, Jr. et al.
6,264,309 B1 7/2001 Sullivan
6,305,790 B1 10/2001 Kawamura et al.

*Primary Examiner*—Allan Olsen

(57) ABSTRACT

In one embodiment, a fluid ejection device comprises a substrate having a fluid slot defined from a first surface through to a second opposite surface; an ejection element formed over the first surface and that ejects fluid therefrom; and a filter having feed holes positioned over the fluid slot near the first surface. Fluid moves from the second surface through the feed holes to the ejection element. In a particular embodiment, the filter is formed of a first material that is surrounded by a second material. In another particular embodiment, the filter is formed from the back side and is formed of the same material as the substrate.

4 Claims, 11 Drawing Sheets

PARTICLE TOLERANT ARCHITECTURE FOR FEED HOLES AND METHOD OF MANUFACTURING

TECHNICAL FIELD

The invention relates to architectures of feed holes for fluid ejection devices and a method of manufacturing the same.

BACKGROUND OF THE INVENTION

Printheads for ink jet printers include components that cooperate with an integrated ink reservoir to deliver ink to an ink ejection device. As printheads deliver higher print resolutions, there is a desire to form printhead structures to direct ink flow from the reservoir or fluid supply through the printhead while preventing debris from entering the firing chambers or contaminating the ink.

Debris that may pass through printhead structures is often trapped by narrow feed channels, thereby inhibiting ink flow. Filters may be incorporated into the printhead to trap debris before it blocks ink flow and affects the print quality. Adding separate filters to printheads, however, increases the number of manufacturing steps required to make a printhead. Further, thin film filters tend to fail during the manufacturing process because there is not enough material to strengthen and support the filter structure.

There is a desire for a particle tolerant ink jet printhead structure that can be reliably manufactured.

There is also a desire for a manufacturing method that can define a particle tolerant architecture for ink jets while maintaining structural strength and stability.

SUMMARY OF THE INVENTION

Accordingly, an embodiment of the present invention is directed to a fluid ejection device comprising a substrate having a fluid slot defined from a first surface through to a second opposite surface, an ejection element formed over the first surface and that ejects fluid therefrom, and a filter having feed holes positioned over the fluid slot near the first surface, wherein fluid moves from the second surface through the feed holes to the ejection element, wherein the filter is formed of a first material that is surrounded by a second material.

Another embodiment of the invention is directed to a method of manufacturing a fluid ejection device comprising applying a mesh pattern over a back side of a substrate opposite a circuit side, wherein the mesh pattern defines at least two apertures therein, and wherein the mesh pattern is substantially more resistant to an etchant than the substrate material, and etching the substrate and the mesh pattern with an etchant from the back side to form a slot from the back side to the circuit side of the substrate, and to form a plurality of filters in the slot and adjacent the circuit side of the substrate that corresponds to the at least two apertures in the mesh pattern.

A further embodiment of the invention is directed to a method of manufacturing a fluid ejection device comprising applying a mesh pattern over a front side of a substrate opposite a back side, wherein the mesh pattern defines at least two apertures therein, and wherein the mesh pattern is substantially more resistant to an etchant than the substrate material, and DRIE etching the substrate and the mesh pattern with an etchant from the front side to form a trench partially through the substrate in each of the at least two apertures of the mesh pattern, wherein a wall is formed in between each of the adjacent trenches, and isotropically etching the wall formed in between each of the adjacent trenches to form one large trench in the substrate bordered on one side by the mesh pattern.

Another embodiment of the invention is directed to a method of manufacturing a fluid ejection device comprising forming depressions in a first side of a substrate, depositing in the depressions a first material surrounded by a second material to form an etch stop in each of the depressions, and etching the substrate with an etchant to form a fluid slot through the substrate, wherein each of the depressions form part of a particle tolerant architecture within the fluid slot.

Further aspects of the invention will be apparent after reviewing the detailed description below and the corresponding drawings.

BRIEF DESCRIPTION OF THE DRAWINGS

In the accompanying drawings, like reference symbols designate like parts throughout. These drawing figures are not drawn to scale, but only representative of the embodiments of the present invention.

DETAILED DESCRIPTION OF THE EMBODIMENTS

Figure 1:
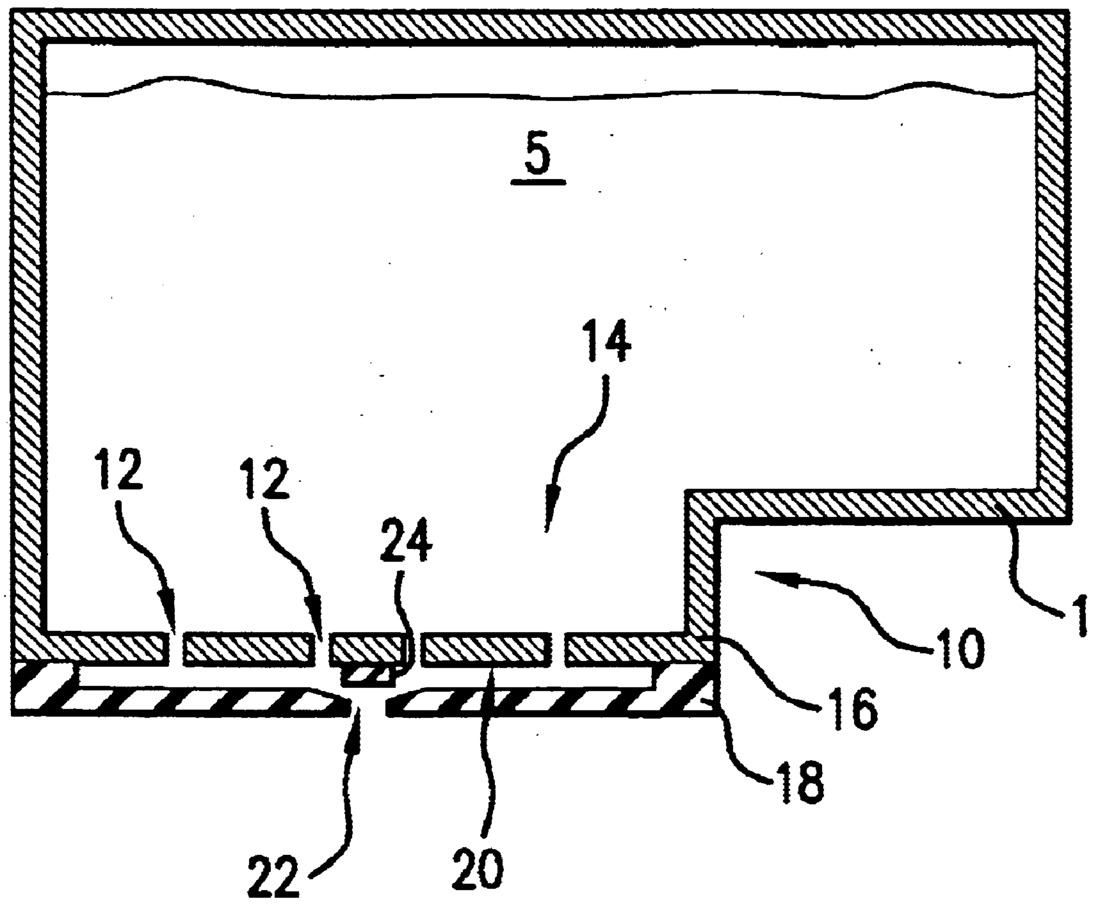
FIG. 1 is a representative diagram of a print cartridge or pen with a printhead structure having a particle tolerant architecture according to the present invention.

FIG. 1 is a representative diagram of a print cartridge (or pen) 1 having a printhead structure 10 according to one embodiment of the present invention. In one embodiment, the inventive structure 10 includes a plurality of ink (or fluid) feed holes 12 and a trench 14 formed in a substrate 16, such as a silicon substrate. The feed holes 12 act as a particle tolerant architecture (which can be a filter or a mesh pattern or a mesh structure). In various embodiments, the substrate is one of the following: single crystalline silicon, polycrystalline silicon, gallium arsenide, glass, silica, ceramics, or a semiconducting material. The various materials listed as possible substrate materials are not necessarily interchangeable and are selected depending upon the application for which they are to be used.

The feed holes 12 and the trench 14 are disposed between a fluid supply or reservoir 5 and an orifice layer 18 that includes a firing chamber 20 and a nozzle opening 22. A resistor or heating element 24 disposed on the substrate 16 provides the heat that initiates fluid firing or ejecting through the nozzle 22. In one embodiment, the material forming the orifice layer 18 is a polymer. The orifice layer 18 may be applied as a dry film in one embodiment. In another embodiment, the polymer may be applied as a liquid. In an alternative embodiment, the orifice layer is a composite layer having at least two layers. In one embodiment having at least two layers, the first layer is a fluid barrier layer that defines the firing chambers about the heating elements, and the second layer defines the orifices over the fluid barrier layer. In one embodiment, there is an ejection element which refers to the microelectronics and thin film layers that enable fluid ejection, including, for example, a resistor, conductive traces, a passivation layer, a cavitation layer, and the orifice layer.

In one embodiment, the multiple feed holes 12 form a particle tolerant architecture by providing redundant ink paths for each firing chamber 16 and nozzle 22. As a result, ink can reach the chamber 16 even if particles block one or more of the feed holes 12, depending on the specific architecture. The feed holes 12 themselves can have any shape or configuration. Further, any number of holes 12 can be used to provide multiple ink feed paths in the printhead.

Figures 2A, 2B, 2C, 2D, 2E, 2F:
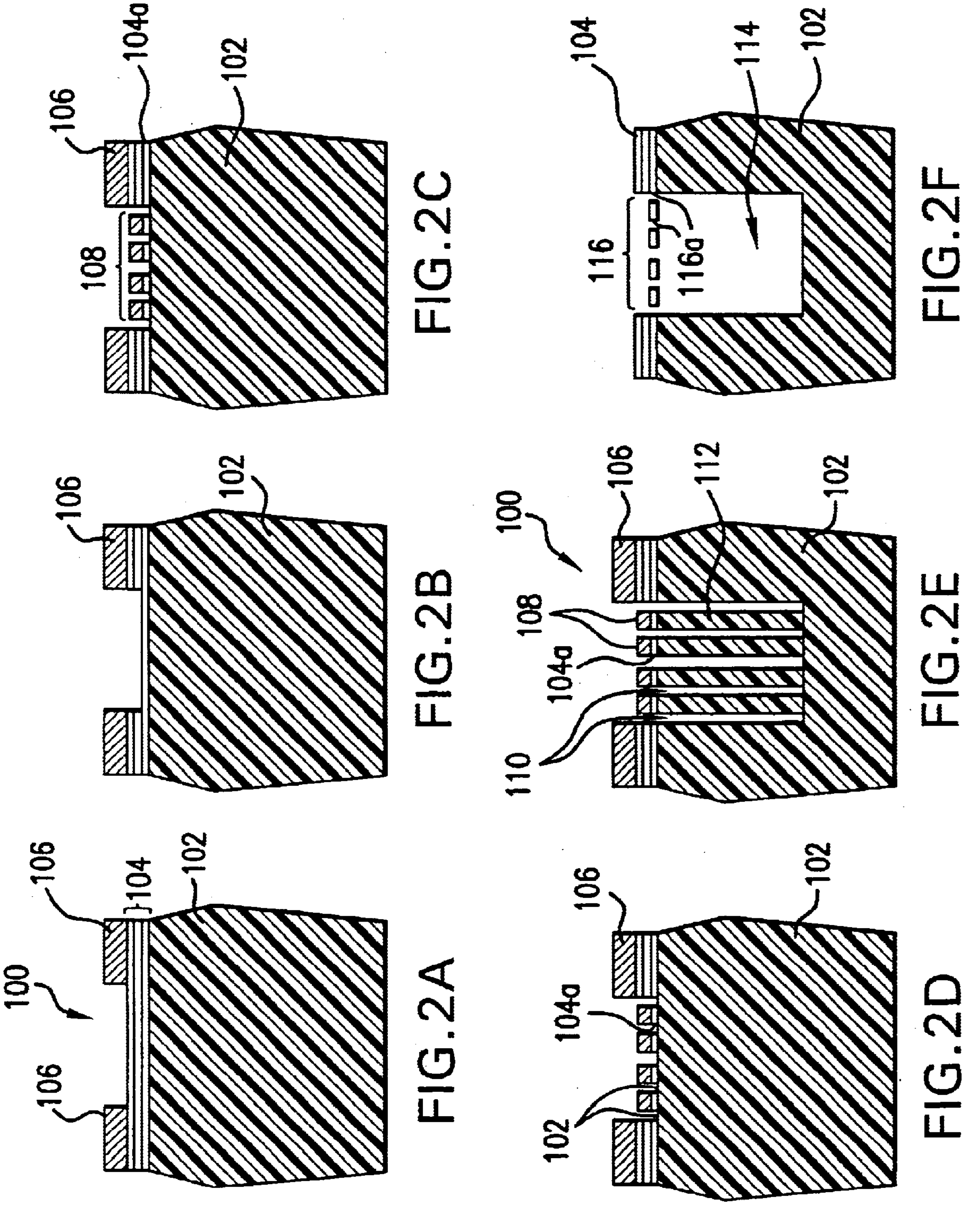
FIGS. 2A through 2F illustrate manufacturing a feed hole structure according to one embodiment of the invention.

FIGS. 2A through 2I illustrate one embodiment of an inventive method for manufacturing a particle tolerant printhead architecture. The structure 100 in this example is formed using a silicon substrate 102. In other embodiments, the substrate is formed of a different material, such as glass or polymer. As shown in the embodiment of FIG. 2A, a multi-layered film 104 is deposited on the silicon substrate 102 and a feed hole boundary mask layer 106 is applied on the film 104. The mask layer 106 can be any standard photoresist conventionally used in semiconductor processing techniques, preferably a positive photoresist.

In this embodiment, the multi-layered film 104 includes, for example, an oxide layer (FOX) 104*a* grown as a bottom layer directly onto the silicon substrate 102, a conductive layer (forming the conductive traces), a resistive layer (forming the resistor), a silicon carbide and/or silicon nitride layer as a passivation layer, and a tantalum layer as a cavitation barrier layer. In this embodiment, the feed hole boundary mask 106 is applied over the film layers 104. As shown in this embodiment, a central portion of the boundary mask 106 is removed in an area where a particle tolerant architecture is to be formed, as described in more detail below, thereby exposing the thin film layers 104. The boundary mask 106 further defines the peripheral boundary of the feed hole structure 100 in this embodiment.

Next, as shown in the embodiment of FIG. 2B, most of the thin film layers 104 in the exposed area are removed through etching. In an alternative embodiment, the etching process also may partially remove the oxide layer 104*a*, leaving a thinner oxide film on the silicon substrate 102 in this exposed area, as compared to the thickness of oxide film under the boundary mask 106.

After the film 104 has been etched, a mesh pattern (mask) 108 is applied on the thin oxide film as shown in the embodiment of FIG. 2C. The mesh mask 108 can be any known photoresist material and patterned via any standard photoresist processing. In this embodiment, the mesh mask 108 defines the multiple channels that the final feed hole structure will have. By forming a mesh having multiple openings for channeling fluid instead of a single opening, the feed hole structure 100 aids in preventing particles in the fluid supply from blocking each of the fluid paths on the way to the firing chamber. In this embodiment, the mesh mask 108 itself can define two or more channels having any desired shape or arrangement. The channels can, for example, be multiple rectangles or squares arranged in a selected area. Possible mesh configurations are illustrated in FIGS. 5, 6, 7, 8, 9 and 10.

The portion of the thin oxide film 104*a* exposed by the mesh mask 108 and the boundary mask 106 is then removed via a wet or dry etching process, a wet strip, or any other standard photoresist processing, as shown in the embodiment of FIG. 2D. This step re-exposes areas of the silicon substrate 102 that are not covered by the mesh mask 108 and the boundary mask 106, as shown in this embodiment. In this embodiment, the portions of the oxide film 104*a* that are covered by the mesh mask 108 will eventually form a mesh portion defining the feed hole structure 100.

Next in this embodiment, the re-exposed portions of the silicon substrate 102 are etched from the thin film side through the mesh mask 108 using any deep etching process as shown in FIG. 2E. In one embodiment, an anisotropic deep reactive ion etching process (DRIE) is used. In this particular embodiment, the exposed section is alternatively etched with a reactive etching gas and coated until the fluidic channel is formed. In one exemplary embodiment, the reactive etching gas creates a fluorine radical that chemically and/or physically etches the substrate. In this exemplary embodiment, a polymer coating that is selective to the etchant is placed on inside surfaces of the forming trench, including the sidewalls and bottom. The coating is created by using carbon-fluorine gas that deposits $(CF_2)_n$, a TEFLON-like material or TEFLON-producing monomer, on these channel surfaces. In this embodiment, the polymer substantially prevents etching of the sidewalls during the subsequent etch(es). The gasses for the etchant alternate with the gasses for forming the coating on the inside of the trench.

The embodiment of FIG. 2E illustrates the structure 100 after the deep silicon etch process described above is performed. As shown in the Figure, the deep silicon etching process cuts deep trenches (or depressions) 110 into the silicon substrate 102 below the areas not covered by the mesh mask 108, leaving silicon walls 112 under the regions covered by the mesh mask 108. In another embodiment, the etching process may use the same reactive ion etching gas as the DRIE etching process but without the polymer coating.

Next in this embodiment, an etching process, such as either a wet or dry isotropic etching process, removes the silicon walls 112, the feed hole mask 106, and the mesh mask 108, as shown in FIG. 2F. Note that both wet and dry etching processes may etch laterally areas other than the silicon walls 112 even though this is not shown in FIG. 2F. This step can be conducted at the same time as the deep silicon etch shown in FIG. 2E by switching the deep etching process to an isotropic etching process. By removing the silicon walls 112 in this embodiment, the etching process creates a large trench 114 capped by the remaining oxide layer 104*a* which now forms an oxide mesh 116 having multiple openings 116*a* and that is surrounded by the multi-layered thin film layers 104.

Figure 2I:
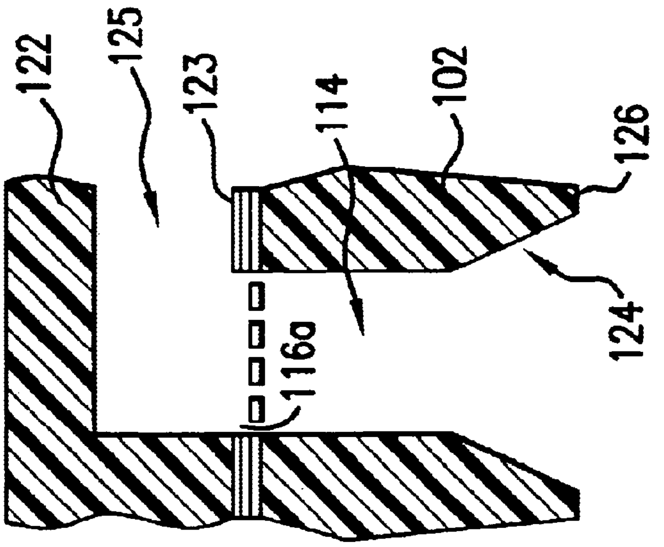
Figure 2H:
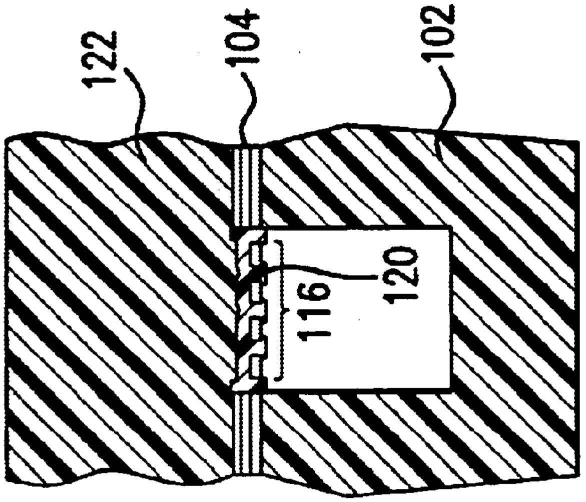
Figure 2G:
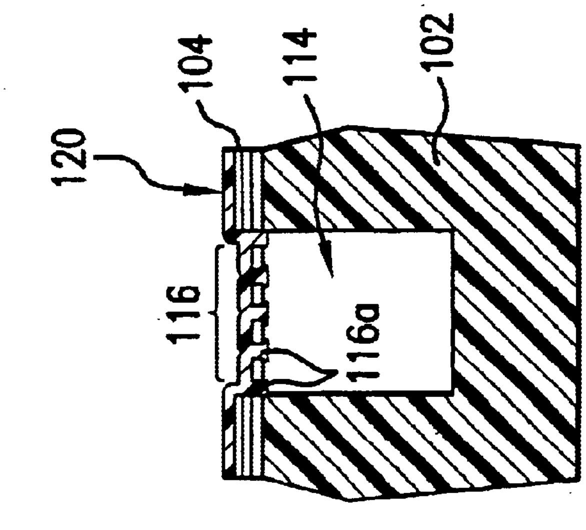

As shown in FIG. 2G, after the trench 114 and mesh 116 structures have been formed, a protective layer 120 is deposited over the frame 118 and the mesh 116, covering the openings 116*a* and preventing errant material, generated from the subsequent manufacturing process described below, from lodging in the feed holes 116*a*. The protective layer 120 can be deposited using, for example, plasma enhanced chemical vapor deposition (PECVD) or any other deposition process. The specific protective layer material 120 can be, for example, a thermal oxide such as a tetraethylorthosilicate (TEOS) based oxide film or any other similar material that can be deposited and later removed from the mesh 116 by a process that minimally removes adjacent materials. In one embodiment, the protective layer 120 material is applied to the mesh 116 so that the material seeps into the mesh openings 116*a*, closing the openings 116*a* completely and preventing errant material freed in later manufacturing steps from being caught in the openings 116*a*.

Referring to FIG. 2H, once the mesh 116 and its corresponding feed holes 116*a* are protected by the barrier layer 120, the protective layer 120 is patterned in this embodiment by removing the portions covering the thin film layers 104 so that the protective material 120 only covers the feed holes 116*a* and the mesh structure 116. In this embodiment, an orifice layer 122 is then applied on top of the thin film layers 104 and the protected mesh 116, as shown in FIG. 2H. In the embodiment shown in FIG. 21, the substrate surface closest to the orifice layer 122 is a "circuit side" 123 of the substrate because circuit components, such as resistors formed in the thin film layers 104, are on this side of the substrate to complete the printhead (or fluid ejection device).

As shown in the embodiment of FIG. 2I, a back side etching process, which can be a wet, dry or hybrid etching process, removes more of the silicon substrate 102 material, from the back side opposite the circuit side of the substrate, to form an opening 124 through to the trench 114 to complete a fluid slot. In one embodiment, the opening 124 is etched with a dry etch process. In another embodiment, the opening 124 is etched with a wet etch process. In another embodiment, the opening 124 is etched with a hybrid etch process. In an additional etching process, such as a buffered oxide etch, the protective layer 120 and any remaining mask material is removed to open the feed holes 116*a* in this embodiment. The resulting structure 116 allows fluid to pass from the fluid supply through the opening 124 into the trench 114 and through the mesh openings 116*a* toward a feed channel 125 formed in the orifice layer 122.

In one embodiment, by defining the feed holes 116*a* in the mesh 116 first and then capping the feed holes 116*a* with the protective layer 118 before manufacturing the orifice layer 122, the method shown in FIGS. 2A through 2I can define feed holes 116*a* without trapping particles in the mesh layer 116 during the additional manufacturing steps illustrated in FIGS. 2H and 2I.

Other embodiments of the inventive structure and process are possible, for example as shown in FIGS. 3A through 3I and as described below. FIGS. 3A through 3I illustrate another etching process for creating a particle tolerant structure having a large trench opening into multiple, smaller feed holes according to the invention.

Figure 3A:
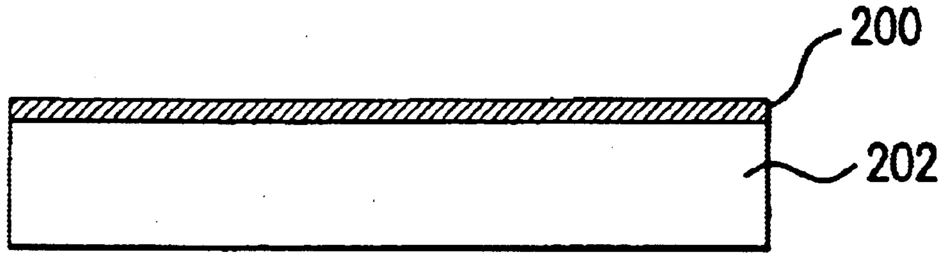
FIGS. 3A through 3I illustrate another embodiment for manufacturing a feed hole structure according to the invention.
Figure 3B:
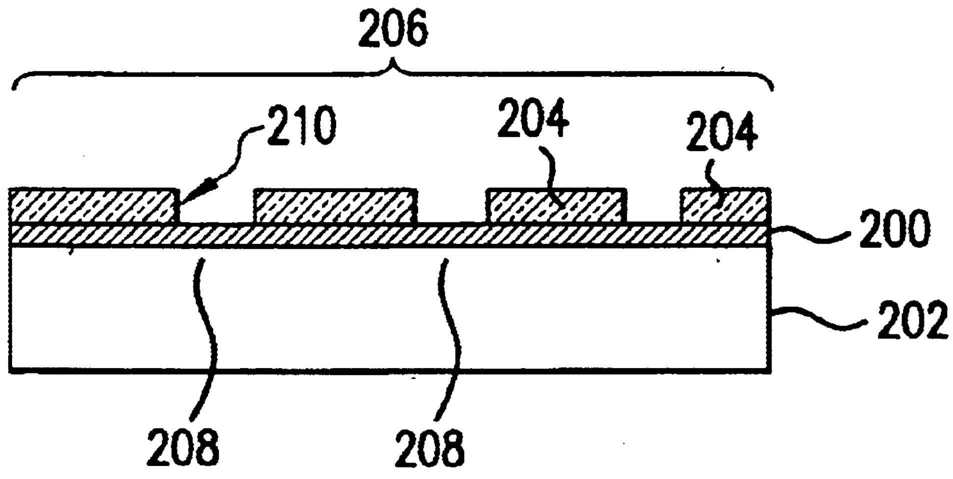
Figure 3C:
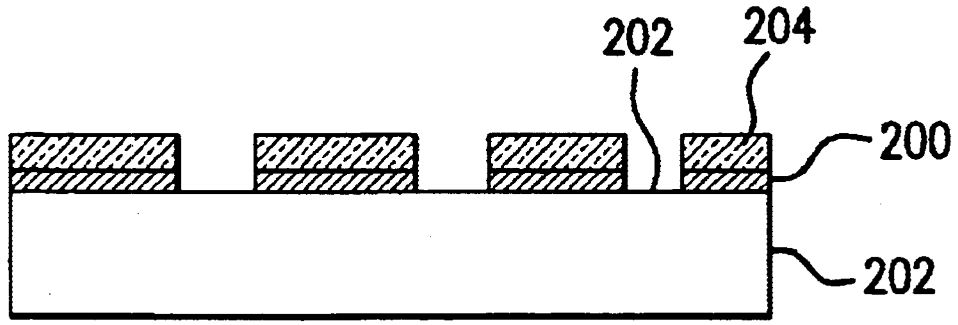

In one embodiment as shown in FIG. 3A, an oxide layer 200 is deposited on a silicon substrate 202. In this embodiment, the oxide layer 202 protects the silicon 202 during a depression etch process on a circuit side of the structure, which will be described below. Next, the oxide layer 200 is protected with a photoresist mask 204 having a mesh pattern 206 defining the location of feed holes 208 and a trench boundary 210 (FIG. 3B). The oxide layer 200 is then etched using the photoresist mask 204, as shown in FIG. 3C, via a wet or dry etching process.

Figure 3D:
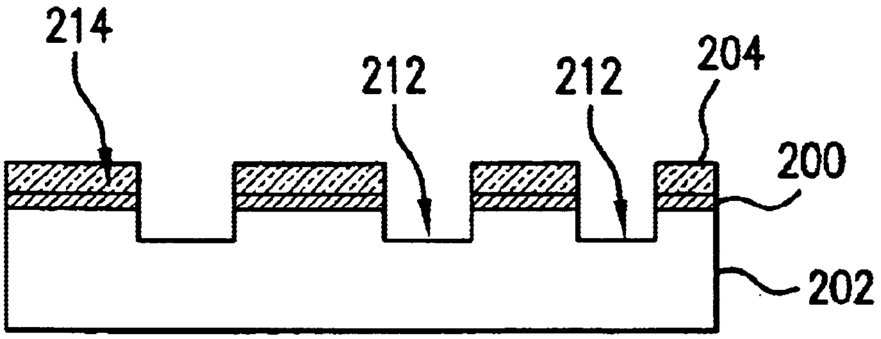

After the oxide layer 200 is patterned to expose the silicon 202, a wet or dry etching process removes silicon 202 to form depressions or trenches 212, as shown in FIG. 3D. Like the embodiment described above, the etched depressions 212 are formed on the circuit side of the structure.

The etching process itself can be either a dry (plasma) etch or a wet etch process, but note that dry etching silicon provides the option of patterning without first growing the oxide layer 200 by depositing the photoresist 204 directly on the silicon substrate 202. Note, for example, that the oxide layer 200 can be left out if dry etching is used in the patterning process. However, for etched silicon depths greater than 20 to 50 microns, for example, the oxide layer 200 may still be beneficial as an additional mask to control the etching rate and depth. Determining whether to use an oxide layer 200 in a given etching process and calculating the specific thickness of the oxide layer 200 and photoresist 204 are within the capabilities of those skilled in the art.

Figure 3E:
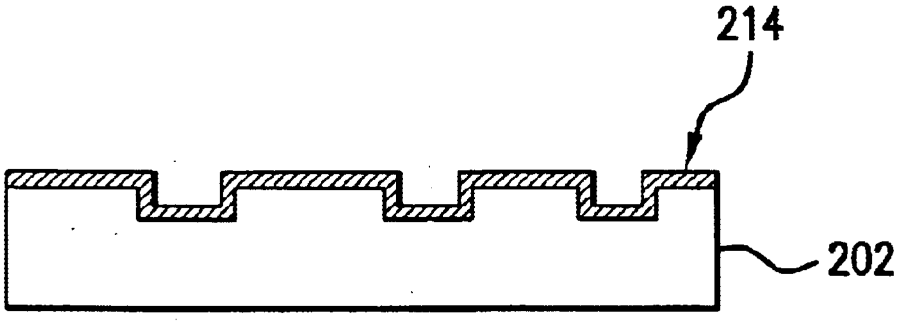

Referring to FIG. 3E, the oxide layer 200 and photoresist layer 204 are stripped via a standard wet etch, such as a buffered oxide etch or any other etch process known in the art, and a new oxide layer 214 is grown over the etched silicon 202. The new oxide layer 214 can be, for example, a thermal oxide layer. The new oxide layer 214 is deposited over the entire surface of the etched silicon substrate 202 and follows the depressions 212 on the substrate surface formed by the previous etching process. Note that a silicon-based dielectric material may be used for the layer 214 instead of the thermal oxide.

Figure 3F:
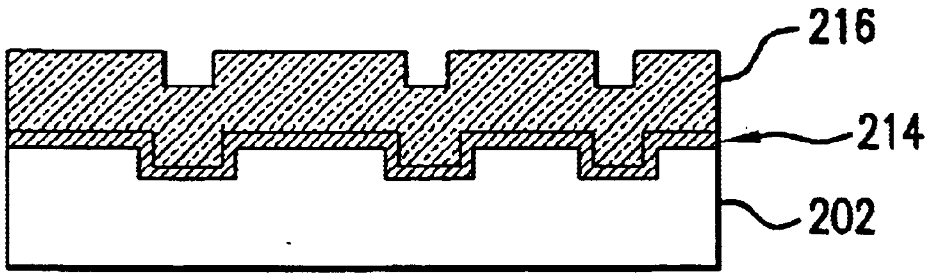

A polysilicon layer 216 is then deposited using any known deposition method on the new oxide layer 214, as shown in FIG. 3F. The polysilicon layer 216 should be thick enough to fill the trenches. In one embodiment, the polysilicon deposition process can be conducted with a batch epitaxial reactor. In one embodiment, a silene-type material decomposes thermally at low pressure, causing silicon to collect on the oxide layer 214.

Figure 3G:
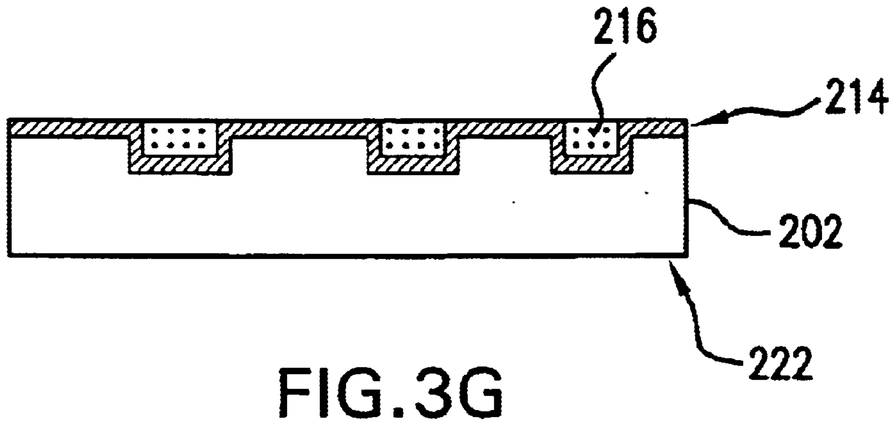

The polysilicon layer 216 is then polished to bring the polysilicon material flush with the new oxide layer 214 (FIG. 3G). The polished surface provides a flat base for fabricating circuit components, such as a resistor. The polishing process can be, for example, a chemical mechanical polishing (CMP) process. In one embodiment, the CMP process has a high selectivity to oxide to prevent over-polishing by slowing the polish rate of the new oxide 214 relative to the polysilicon 216. In one embodiment, the silicon-to-oxide etch rate has a ratio of about 50:1.

Figure 3H:
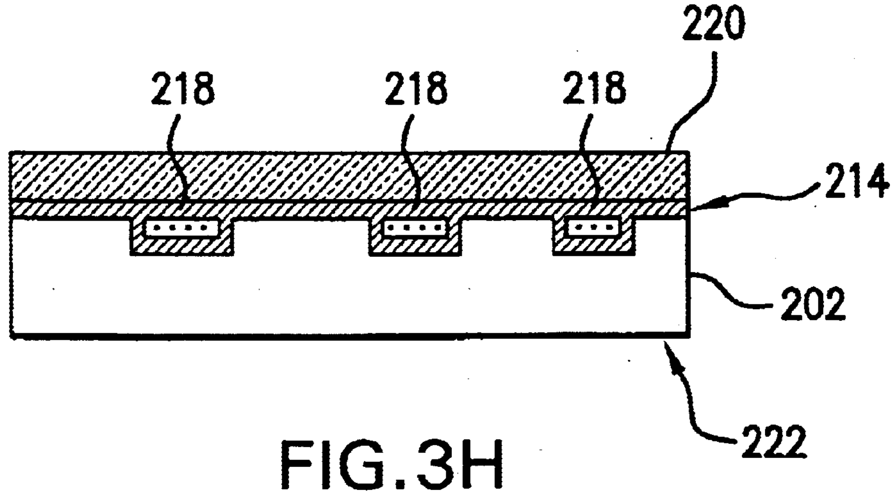
Figure 3I:
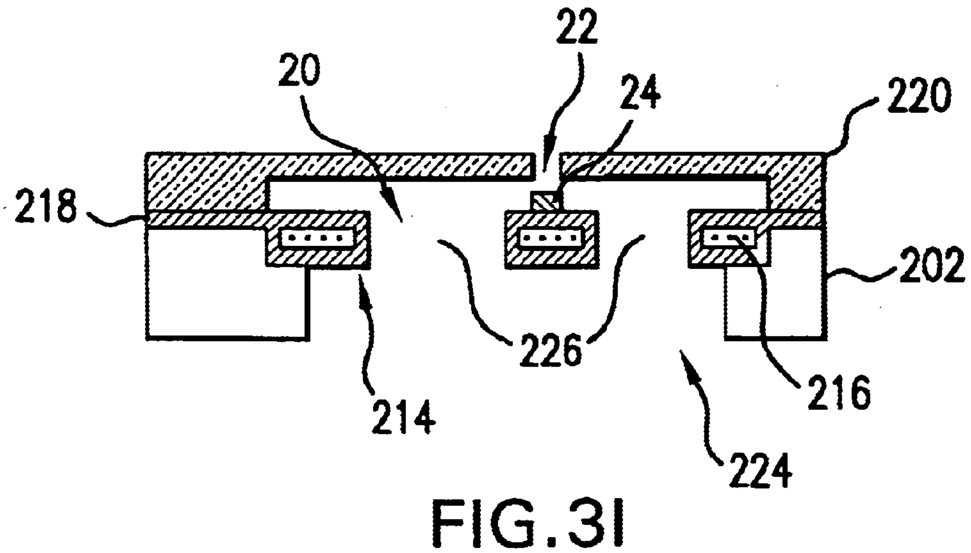

After polishing, additional oxide 218, other layers for circuit components, and an orifice layer 220 are applied over the exposed polysilicon surfaces 216 (FIG. 3H). The orifice layer 220 will eventually form a firing chamber and nozzle for the fluid ejection device. The etch continues to remove silicon 202 in between the areas bounded by the new oxide 214, 218 to form feed holes 226 (FIG. 31). The backside etch can either be a dry etch selected to be selective to the new oxide material 214, 218 surrounding the polysilicon 216 or a wet etch that removes the silicon 202. In one embodiment, the substrate material is removed with the backside etching process, leaving the oxide material 218 that connects each of the filters (the oxide 214, 218 surrounding the polysilicon 216). In order to remove this oxide material and open up the fluid slots through to the firing chamber 20, in one embodiment a buffered oxide etch is used. In other embodiments, any anisotropic etch is used. In some embodiments, the oxide/polysilicon filters 214, 216, 218 are protected with a patterned mask (not shown) during the buffered oxide etch. In another embodiment, the patterned mask can be any photoresist mask applied to the oxide layer 214 after the silicon 202 has been etched to the oxide layer 214. Portions of the orifice layer are also etched using any known process to form the firing chamber 20 and nozzle opening 22.

In one embodiment, the orifice layer 220 in FIG. 3H is patterned through photolithographic techniques to form the firing chamber 20 and orifice 22. In one possible embodiment, a negative mask covers the firing chamber area and is exposed long enough to penetrate through entire orifice layer 220. A second negative mask is then applied and exposed long enough to penetrate the depth of the orifice 22. After exposure, an etching process starting at the silicon layer 202 etches toward the orifice layer 220, breaking through the oxide 218 (and possibly removing at least a portion of oxide layer 214) and etching the orifice layer 220 to form the chamber 20 and orifice 22. Note that although the resistor 24 is riot shown until FIG. 31, any microelectronics can be formed on the oxide layer 214 before the orifice layer 220 is applied. In another embodiment, a protective layer can be applied over and in the openings 226 and removed after the fluid slot is etched through the silicon layer 202.

FIGS. 4A through 4E illustrate yet another process for generating a particle tolerant feed hole structure. Note that the overall process used to obtain the structure shown in FIG. 4 is similar to that shown in FIGS. 3A through 3I. One difference between the two embodiments is that the process used to generate the structure in FIGS. 4A through 4E define the feed hole dimensions by patterning the backside of the substrate with oxide or resist, while FIGS. 3A through 3I illustrate fixing the feed hole dimensions via processing on the circuit side of the substrate.

Figure 4A:
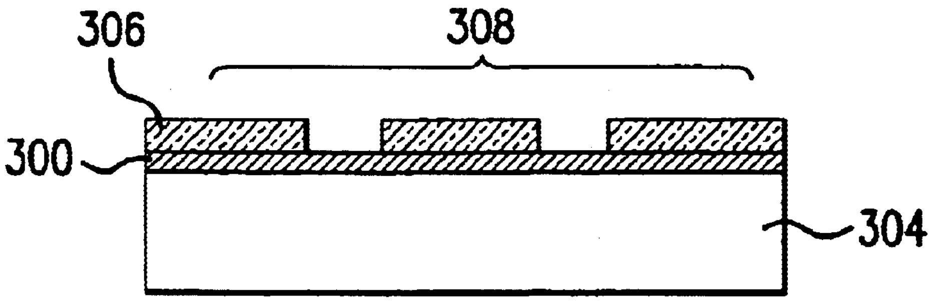
FIGS. 4A through 4E illustrate yet another embodiment for manufacturing a feed hole structure according to the invention.
Figure 4B:
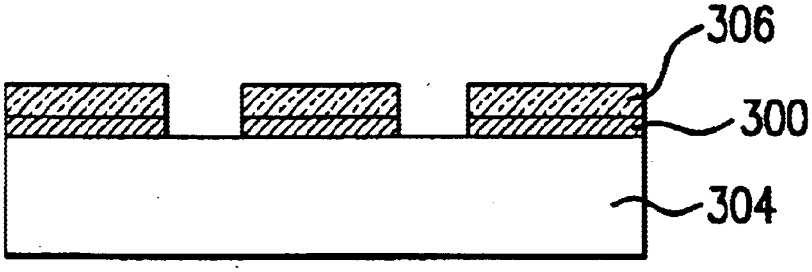

Referring to FIG. 4A, an oxide layer 300 is first deposited on a backside of a silicon substrate 304. Next, a photoresist layer 306 having a mesh pattern 308 is deposited onto the oxide layer 300. The mesh pattern 308 is then etched into the oxide layer 300 using the photoresist layer 306 as a mask as shown in FIG. 4B.

Figure 4C:
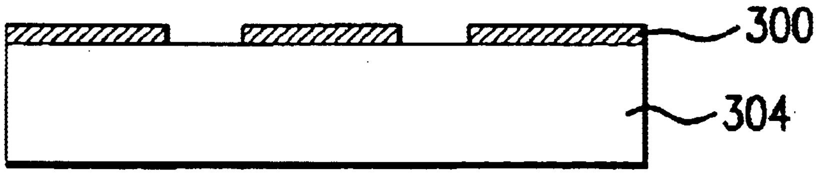
Figure 4D:
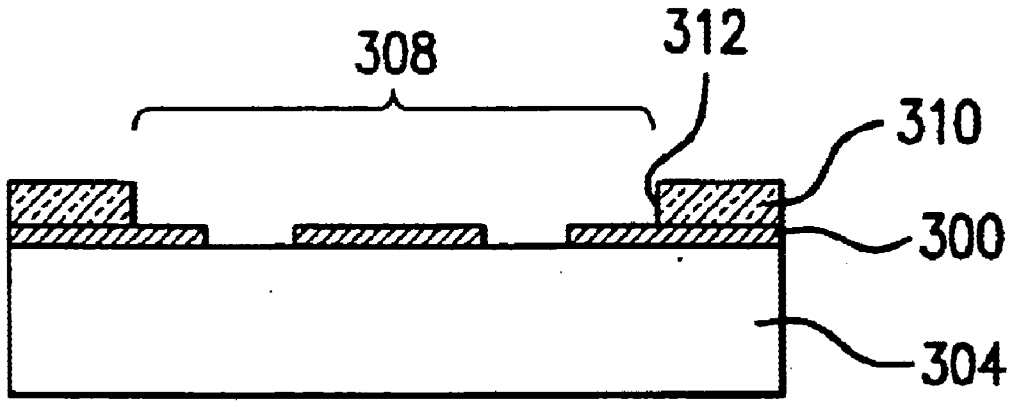

After the mesh pattern is etched via a wet etch, such as a buffered oxide etch, or a dry etch into the oxide layer 300, the photoresist layer 306 is removed, leaving the oxide layer 300 on the silicon substrate 304 as shown in FIG. 4C. Another resist layer 310 can be applied to define a trench boundary 312 (FIG. 4D). The structure then undergoes another etching process, preferably a dry or hybrid etch, to obtain the structure shown at FIG. 4E.

Figure 4E:
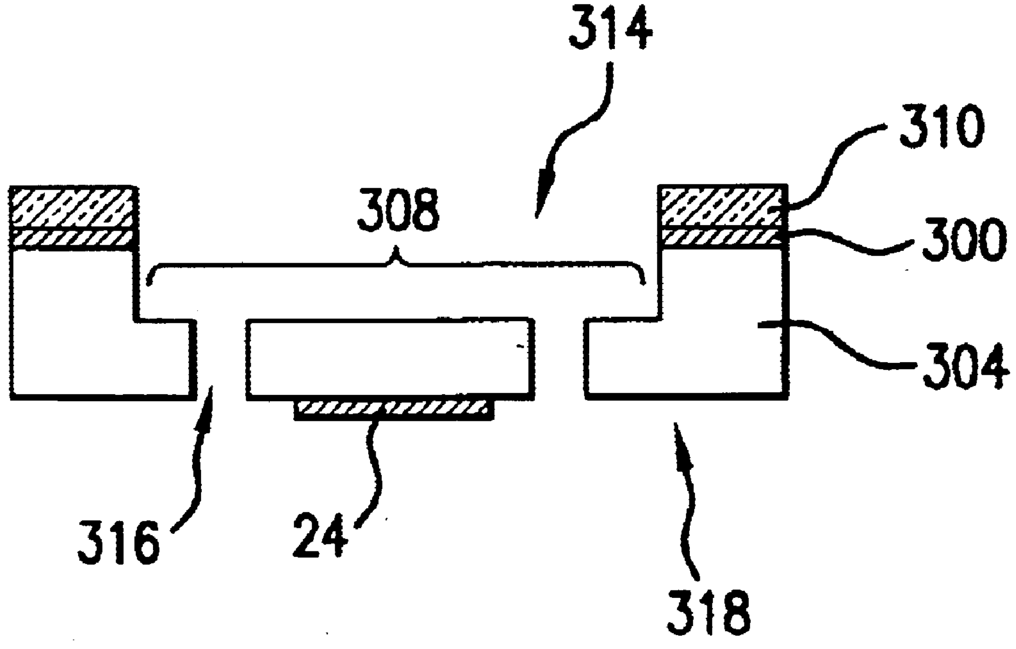
Figure 5:
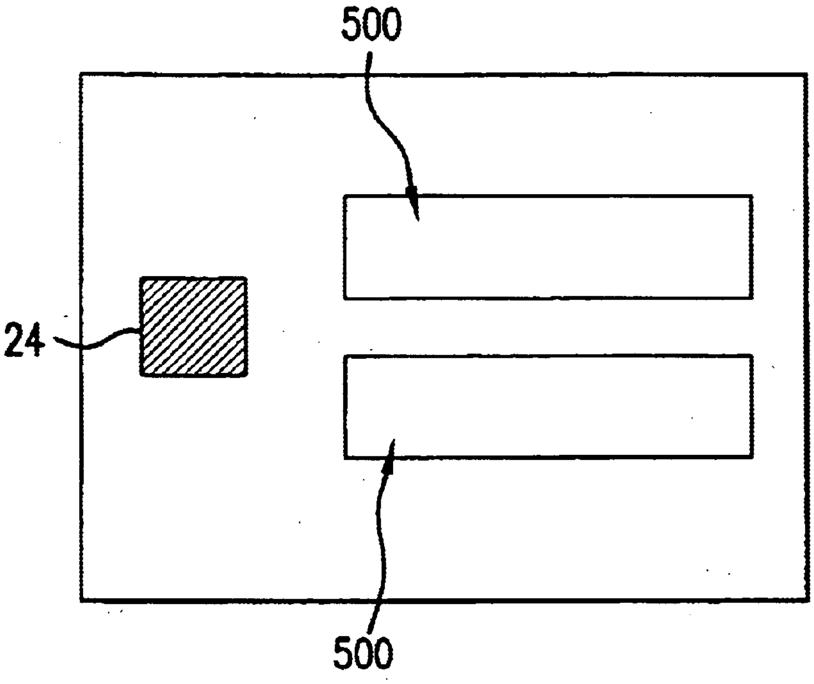
FIGS. 5 through 10 are plan views of possible feed hole configurations according to the invention.
Figure 6:
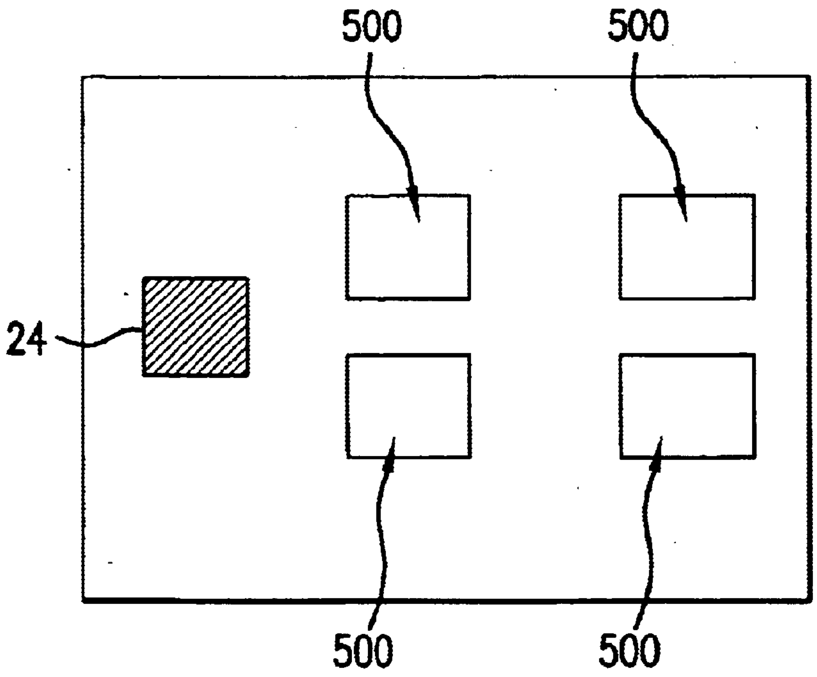
Figure 7:
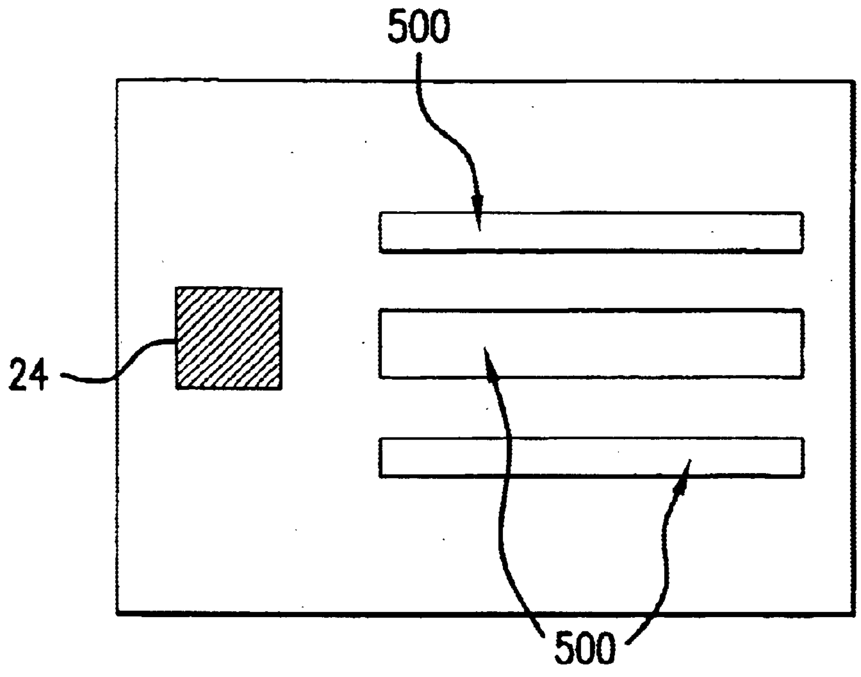
Figure 8:
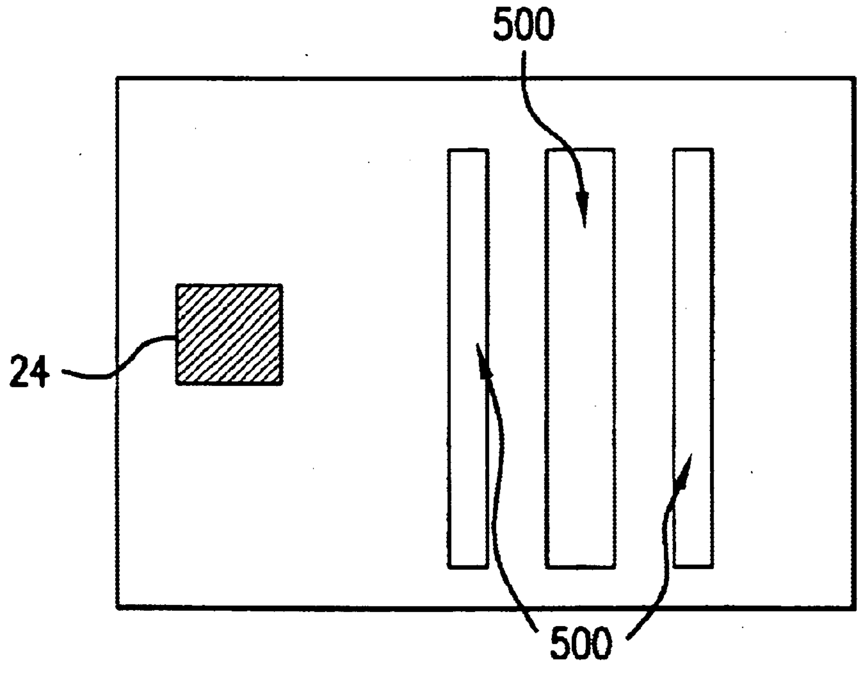
Figure 9:
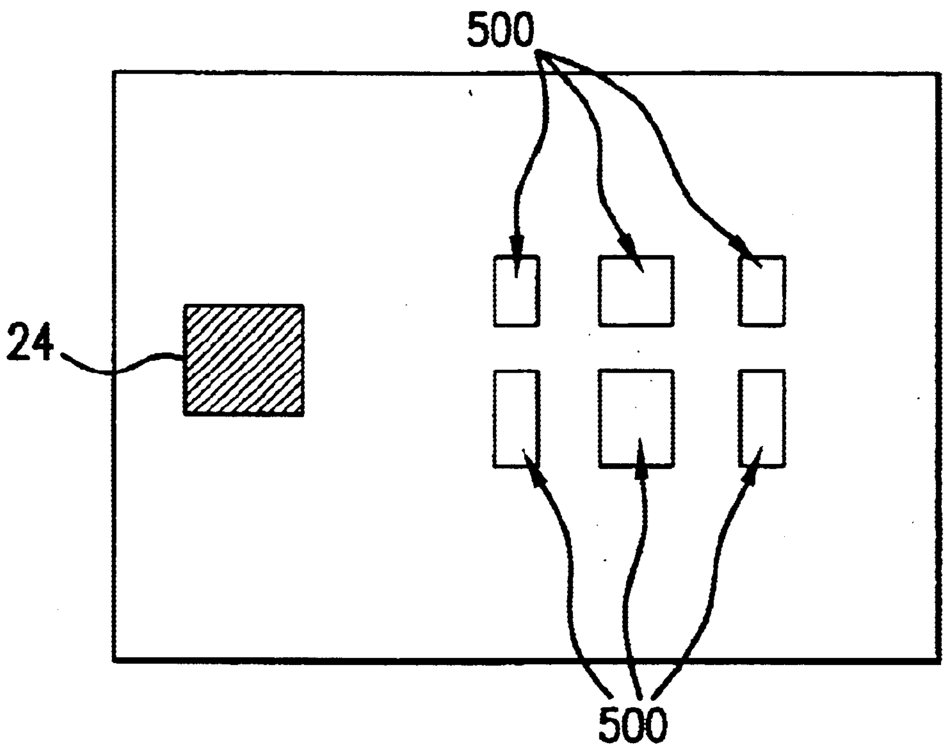
Figure 10:
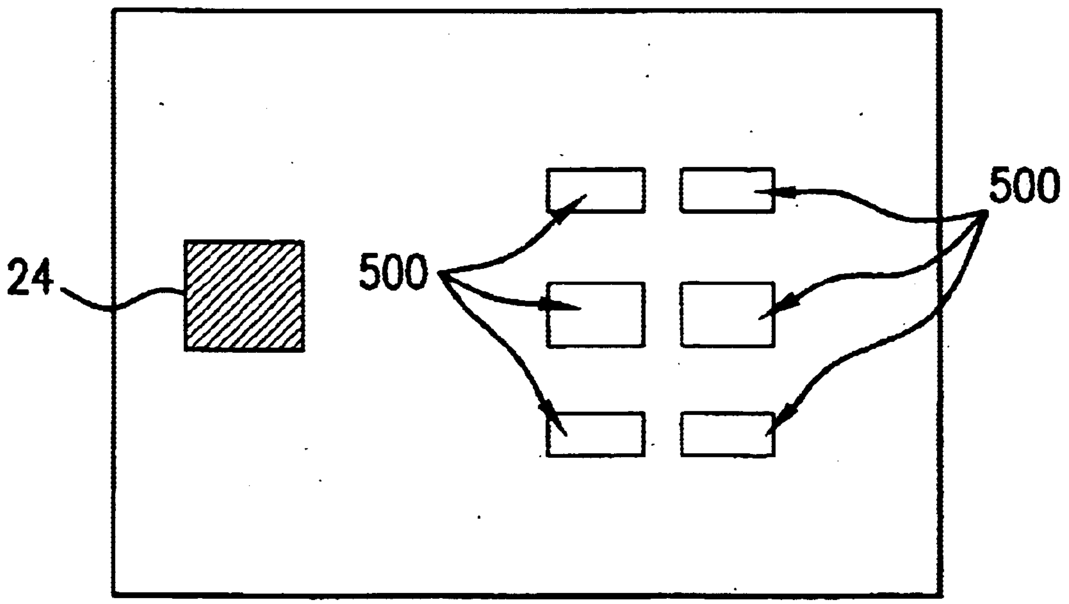

Because the oxide layer 300 has openings defining the mesh pattern 308, a dry etching process will first etch the silicon substrate 304 in the areas uncovered by the oxide layer 300 as well as the oxide layer 300 itself. As the etching process proceeds, the etchant eventually breaks through the exposed oxide layer 300 completely and starts etching the substrate material, as shown in FIG. 4E, to form a wider trench area 314. Alternatively, for closer control of the etching process, the oxide layer 300 can be partially etched along with the uncovered areas of the silicon substrate 304, then stripped before initiating the substrate etching process. Although the etching process eventually removes only silicon to form the trench 314, the oxide layer 300 slows the etching process so that by the time the etch reaches the areas of the silicon substrate 304 originally covered by the oxide layer 300, the silicon 304 left exposed by the oxide layer 300 has been etched relatively deeply to form feed holes 316.

In a first embodiment, the etching of the channels in the substrate shown in FIG. 4E is via the dry etching process, which provides better control of structural dimensions. In this embodiment, the dry etching is inherently anisotropic (DRIE etching). In a second embodiment, the dry etching process is switched during the etching step from the anisotropic dry etching process to the isotropic dry etching process (i.e. without the polymer coating). In this second embodiment, because the etching process began in an anisotropic mode, the polymer sidewall protection is present for some distance from the wafer/substrate backside. Further, as the isotropic etch proceeds, this area with polymer coating is protected from further etching. The deeper substrate material continues to etch isotropically, thereby creating fluid reservoirs internal to the wafer/substrate. In a further embodiment, after the isotropic portion of the etching process, conditions can be changed again to etch anisotropically (DRIE etch) to complete the etching process to the front surface of the substrate.

In several embodiments, wet etching processes include isotropic etching characteristics and does not allow as much control over the etching process as compared with the dry etching process. As shown in FIG. 21, for example, the backside of the substrate is etched with a wet etchant to form the slot. The slot walls exposed to the wet etch process are wider than those etched by the dry etch process.

The final structure, as shown in FIG. 4E is a relatively large trench 314, which acts as the ink feed channel, with small feed holes 316 on a circuit side 318 of the substrate 304. By etching the wafer from the back side to the circuit side in the manner shown in FIGS. 4A through 4E, the process leaves much of the silicon in the wafer structure even after the etching process. The extra silicon 304 can provide structural support for and better heat transfer from, for example, a resistor 24 or other circuit components.

FIGS. 5, 6, 7, 8, 9 and 10 are plan views of possible representative feed hole configurations (not necessarily drawn to scale) generated via any embodiments of the methods described above. Although the examples shown in FIGS. 5 through 10 illustrate square or rectangular-shaped feed holes 500, the feed holes 500 can have any shape and any configuration. As explained above, the feed hole 500 shape and configuration can be controlled by the mesh pattern of the mask used to form the feed holes. Note that although the embodiments in FIGS. 5 through 10 show one or more heating elements, such as the resistor 24, positioned alongside the feed holes 500, heating elements can be placed anywhere near the feed holes 500 to heat fluid to be ejected through the nozzles (not shown here).

As a result, in one embodiment the structures and processes described above create a particle tolerant architecture generally having a relatively large trench acting as distribution manifold for a plurality of feed holes that feed ink into a firing chamber. The multiple feed holes provides redundant ink feed paths to the firing chamber, preventing particles from completing blocking an ink feed path as ink travels to the firing chamber and the printhead nozzle.

In a more particular embodiment, the inventive structure defines particle tolerance in the feed holes themselves rather than depending on a particle tolerant orifice layer geometry or a separate filter to be attached to the printhead. Instead, the inventive method and structure builds an ink particle filter into the silicon wafer fabrication process itself, eliminating the need for special materials or process steps after wafer fabrication of the main ink jet structure is complete and maintaining enough material in the mesh region to provide structural strength.

Note that in several embodiments, each of the etching processes described above can be conducted with a wet etch process, a dry silicon etch, or a hybrid (wet and dry etch processes), to create the inventive feed hole structures without departing from the scope of the invention. Further note that in one embodiment dry etching feed holes from the circuit side of the substrate tend to create particle tolerant architectures having smaller feed holes in the mesh than wet etching.

The feed hole sizes can range from less than a micron to as great as tens of microns. The specific size of the feed holes may be constrained by, for example, manufacturing, tooling and cost constraints. The feed hole sizes may also be selected based on an aspect ratio, which is the feed hole size in plan view versus the etching depth; if the thickness of the material between the feed holes 12 is known, this thickness can be taken into account when selecting a feed hole size. The anticipated size of the particles can also be considered when selecting the feed hole size. It is to be understood by those in the art that particles which the above-described filters include agglomerates of gels, fibers, flakes, dust, precipitates, and suspended solids.

While the present invention has been particularly shown and described with reference to the foregoing preferred and alternative embodiments, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements,

What is claimed is:

1. A method of manufacturing a fluid ejection device comprising:

forming depressions in a first side of a substrate;

depositing in the depressions a first material surrounded by a second material to form an etch stop in each of the depressions; and etching the substrate with an etchant to form a fluid slot through the substrate, wherein each of the depressions form part of a particle tolerant architecture within the fluid slot.

2. The method of claim 1 further comprising:

depositing a removable protective layer over the particle tolerant architecture, wherein the protective layer is removed after the ejection device is formed.

3. The method of claim 2 further comprising forming a fluid ejection element over the particle tolerant architecture.

4. The method of claim 1 wherein the first material is polysilicon and the second material is oxide.

* * * * *